Oct. 6, 1942.　　　C. E. ATTWOOD　　　2,297,682
VISIBLE INDEX AND PROGRESSIVE SIGNAL MEANS
Filed March 14, 1941　　　4 Sheets-Sheet 1
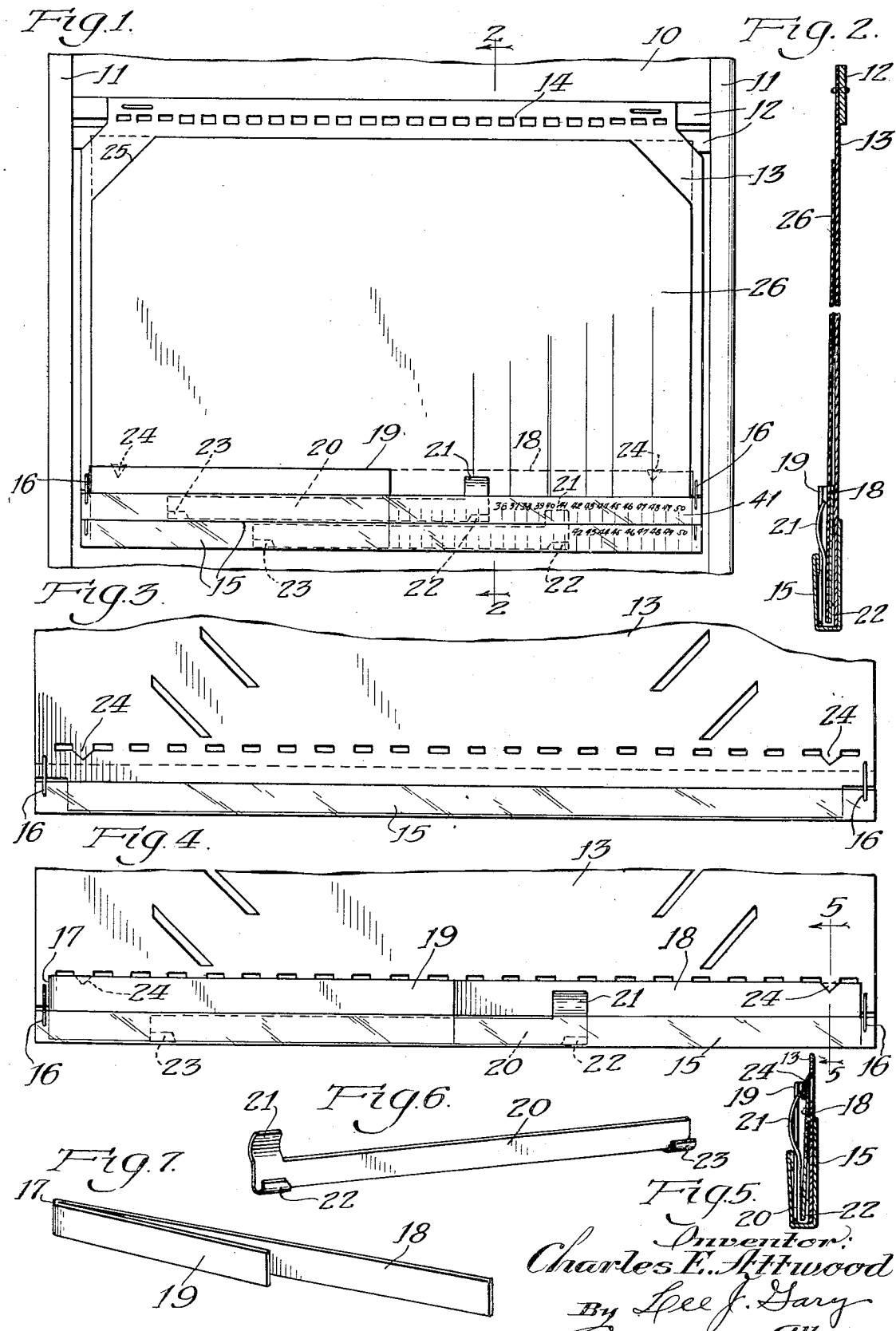

Oct. 6, 1942.   C. E. ATTWOOD   2,297,682
VISIBLE INDEX AND PROGRESSIVE SIGNAL MEANS
Filed March 14, 1941   4 Sheets-Sheet 2
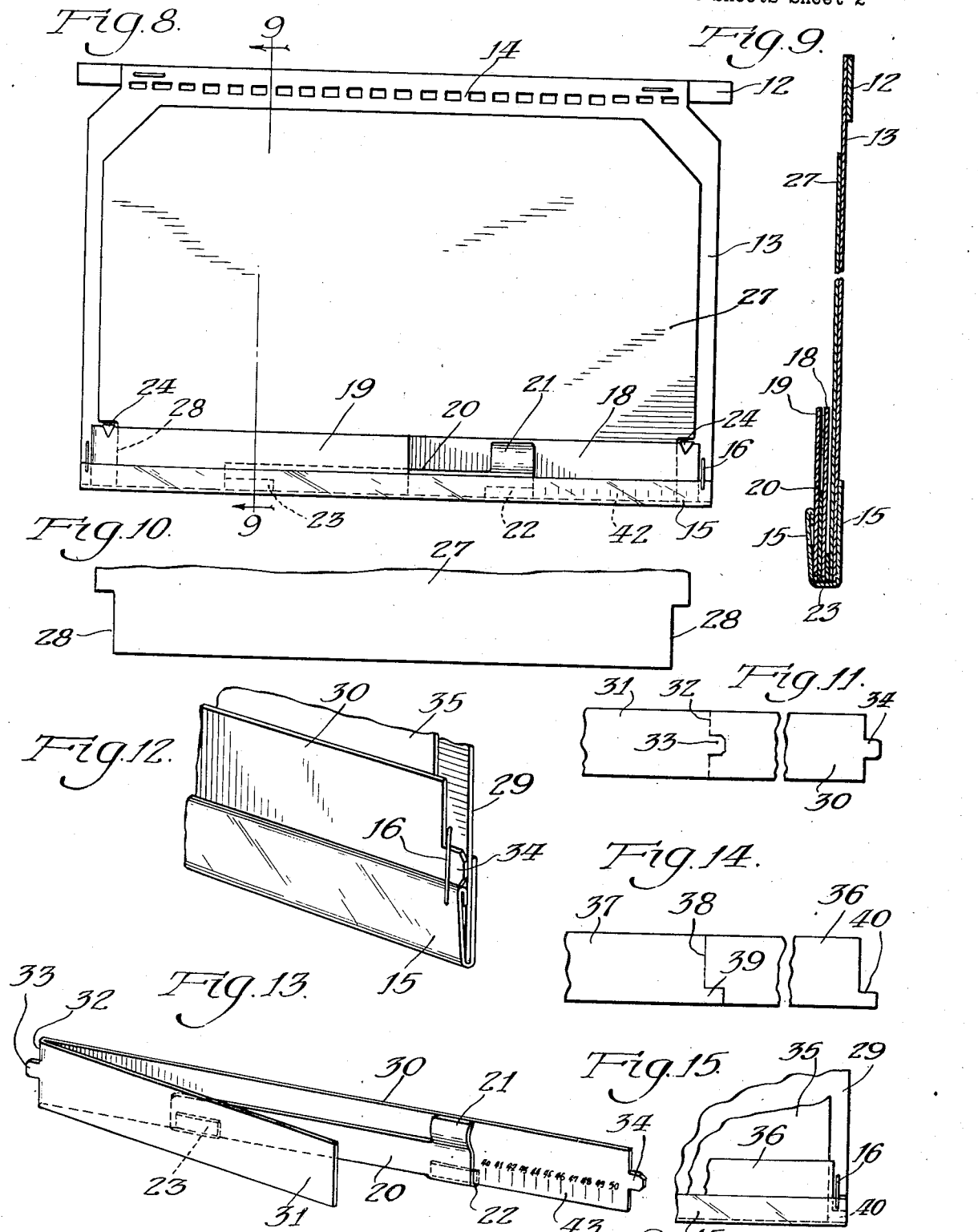

Oct. 6, 1942.    C. E. ATTWOOD    2,297,682
VISIBLE INDEX AND PROGRESSIVE SIGNAL MEANS
Filed March 14, 1941    4 Sheets-Sheet 3
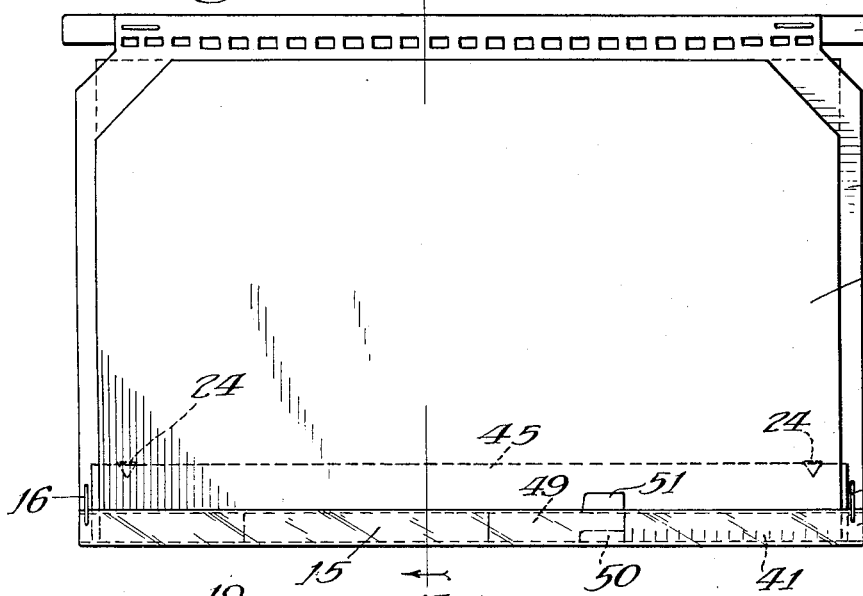
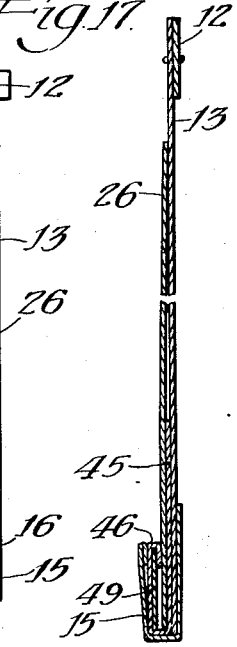
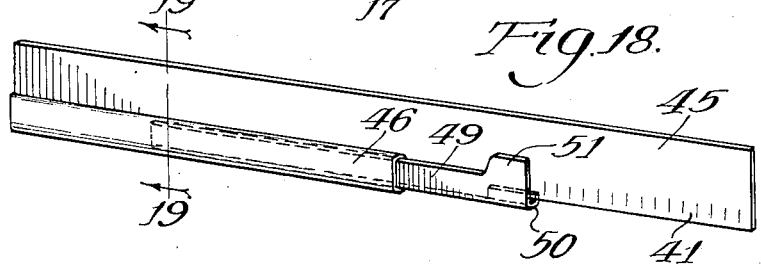
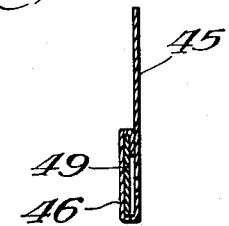
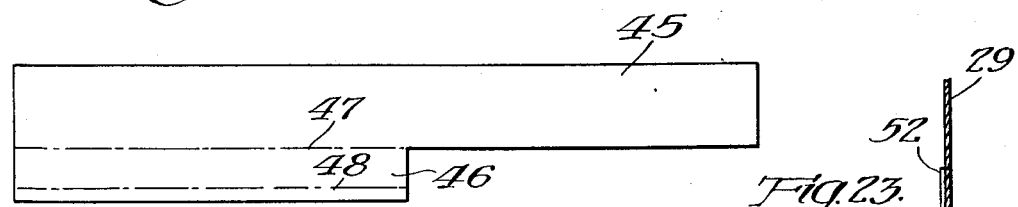
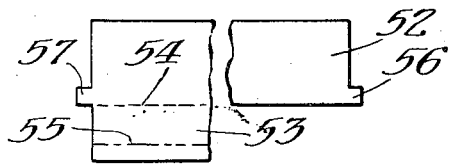
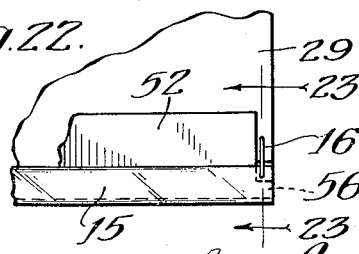
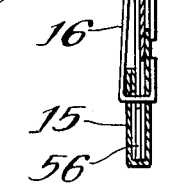
Inventor:
Charles E. Attwood
By Lee J. Gary
Attorney.

Oct. 6, 1942.          C. E. ATTWOOD          2,297,682
VISIBLE INDEX AND PROGRESSIVE SIGNAL MEANS
Filed March 14, 1941          4 Sheets-Sheet 4
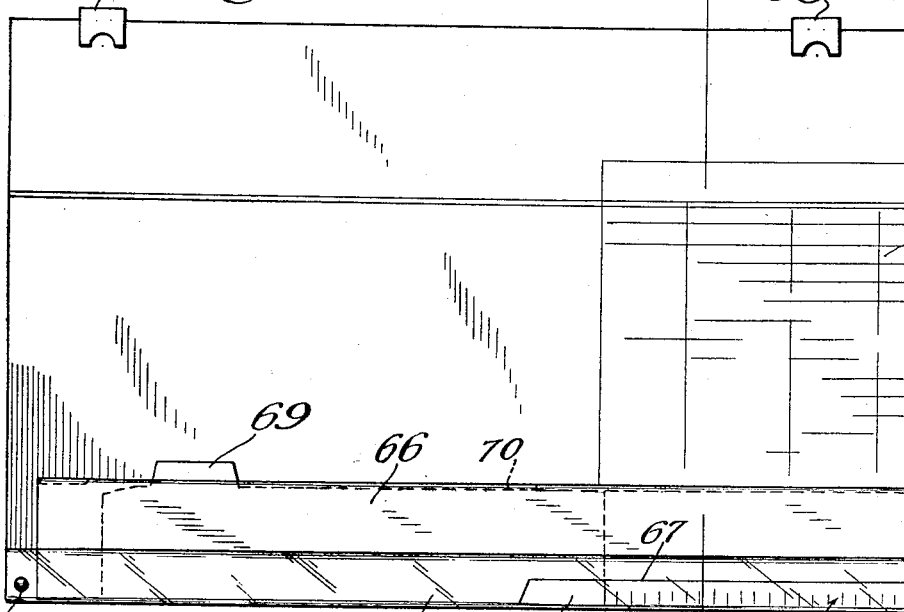
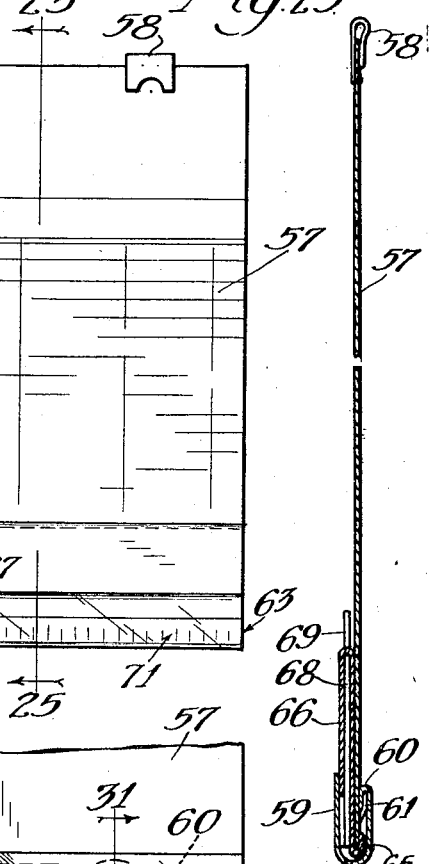
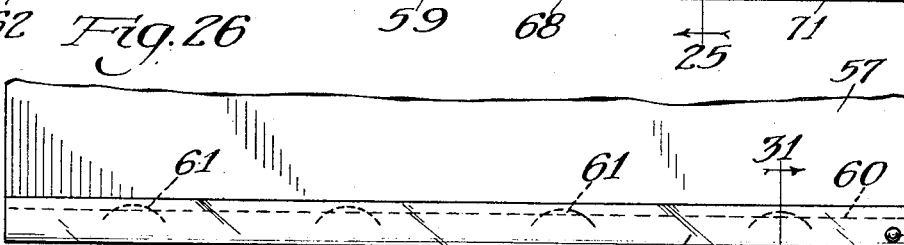
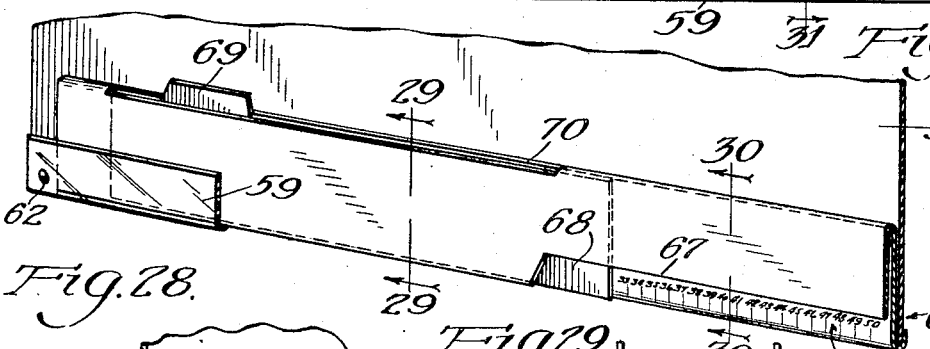
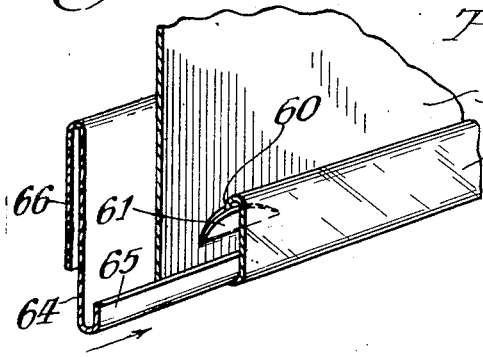
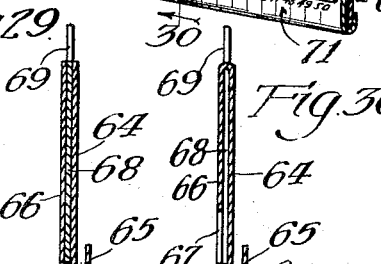
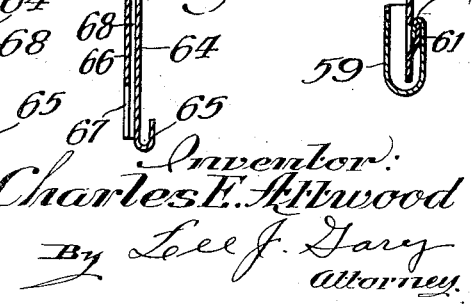
Inventor:
Charles E. Attwood
By Lee J. Gary
Attorney Patented Oct. 6, 1942

2,297,682

UNITED STATES PATENT OFFICE 2,297,682

VISIBLE INDEX AND PROGRESSIVE SIGNAL MEANS

Charles E. Attwood, Chicago, Ill., assignor to Acme Visible Records, Inc., Chicago, Ill., a corporation of Delaware Application March 14, 1941, Serial No. 383,297

20 Claims. (Cl. 129—16.7)

This invention relates to visible record systems and particularly to improvements in signalling means of the progressive type employed in conjunction therewith.

It is an object of this invention to provide a slidably mounted signalling strip which is adapted for use with card holders of a generally conventional type comprising a transparent sheath adjacent the lower marginal edge of the card holder, without the requirement for or necessity of a special type of card holder, and in consequence of which my improvement may be used in conjunction with a wide variety of existing card holder installations.

Another object relates to an insert comprising an overlay means providing a mask adjacent a lower marginal edge portion of a record card for cooperation with a slidably mounted signalling strip and an exposed data bearing portion adjacent the lower edge of the card, the card being adapted to be mounted on a generally conventional type of pocket card holder, the lower marginal edge of the mounted card, insert overlay, and signalling strip being adapted to be inserted and retained in the holder pocket.

Additional objects relate to means whereby my progressive signal strips are engaged adjacent the lower marginal edge of the mounted record cards and cooperative insert; to means whereby the said cooperative inserts are securely engaged and retained in operative position within the holder pocket; and the manner of cooperation of the progressive signal strips with the overlay inserts at such edge.

Other objects relate to details of construction and arrangement of parts, and to the economies thereof, which will be apparent from the accompanying specification and drawings, wherein:

Fig. 1 is a front elevational view illustrating a frame or support and a plurality of card holders mounted thereon illustrating my invention.

Fig. 2 is an enlarged section through one of the mounted card holders on the line 2—2 of Fig. 1.

Fig. 3 is an enlarged fragmentary view of a lower marginal edge portion of a record card holder adapted for use in accordance with my invention.

Fig. 4 is a view similar to Fig. 3 illustrating my signalling strip and cooperative insert overlay mounted on a card holder.

Fig. 5 is an enlarged section on the line 5—5 of Fig. 4.

Fig. 6 is a perspective view of my signalling strip viewed rearwardly thereof.

Fig. 7 is a perspective view of my insert overlay for cooperation with the signal strip illustrated in Fig. 6.

Fig. 8 is a front elevational view of a record card holder similar to that shown in Fig. 1 embodying a modified form of my invention.

Fig. 9 is a section on the line 9—9 of Fig. 8.

Fig. 10 is a fragmentary elevation of the lower marginal edge portion of the index card embodied in Fig. 8.

Fig. 11 is a fragmentary detailed view of a modified form of the insert overlay shown in Fig. 7.

Fig. 12 is a fragmentary perspective view of the lower right hand corner of a pocket card holder having engaged and inserted therein the modified form of overlay shown in Fig. 11.

Fig. 13 is a perspective view of the insert overlay shown in Fig. 11 and having engaged thereto a progressive signal strip.

Fig. 14 is a view similar to Fig. 11 illustrating a further modification of an insert overlay.

Fig. 15 is a fragmentary view of a card holder and engaged card and insert overlay, the insert overlay being of the modified form shown in Fig. 14.

Fig. 16 is a front elevational view of a record card holder similar to that shown in Fig. 1 embodying a further modification of my invention.

Fig. 17 is a section at the line 17—17 of Fig. 16.

Fig. 18 is a perspective view of the modified form of insert overlay and progressive signal strip embodied in Fig. 16.

Fig. 19 is a section at the line 19—19 of Fig. 18.

Fig. 20 is a blank development of the insert overlay shown in Figs. 16 to 19.

Fig. 21 is a fragmentary view of a blank development of an insert overlay similar to that shown in Fig. 20 but of modified form.

Fig. 22 is a fragmentary view with parts broken away of the lower right hand corner of a card holder embodying the insert overlay shown in Fig. 21.

Fig. 23 is a section at the line 23—23 of Fig. 22.

Fig. 24 is a front elevational view illustrating a record card provided with a transparent sheath embracing its lower marginal edge, embodying a further modification of my invention.

Fig. 25 is an enlarged section at the line 25—25 of Fig. 24.

Fig. 26 is a fragmentary rear elevational view of the lower marginal edge of the record card shown in Fig. 24.

Fig. 27 is a fragmentary perspective view with parts in section of the record card embodied in the form of my invention illustrated in Fig. 24, viewed forwardly thereof.

Fig. 28 is a fragmentary perspective view with parts in section of the pocket card and form of overlay illustrated in Fig. 24 viewed rearwardly thereof.

Fig. 29 is a section on the line 29—29 of Fig. 27.

Fig. 30 is a section on the line 30—30 of Fig. 27.

Fig. 31 is a section on the line 31—31 of Fig. 26.

In general my invention comprises a progressive signal device formed of essentially two portions, one being a signalling strip and the other a masking means therefor, the signalling strip being slidably engageable to the masking means, and the two being insertable as a unit within the sheath of a pocket card holder and firmly engaged therein, particularly against accidental upward withdrawal. My improved signalling means are such that generally conventional index cards may be used therewith by inserting the card within the sheath of the holder and beneath the signalling strip and its masking overlay, whereby the signalling strip extends endwise beneath the masking means for variable concealment and exposure thereby and for signalling cooperation with an indicia or scale portion adjacent the lower marginal edge portion of the index card, and in a measure to graphically illustrate the indexed matters.

Referring to the drawings, and particularly Figs. 1 to 7, the reference numeral 10 indicates a frame or support which may be utilized as a drawer of a record cabinet, a leaf of a record book, for filing in vertical drawers, or a unit of the usual swingably mounted record or index stand. The frame 10 is generally constructed of metal with a pair of longitudinal flanges 11 beneath which are maintained the hangers 12 to which the card holders 13 are hingedly engaged by means of the hinged portion 14. It will be understood, however, that various other means for hingedly mounting the card holder well known in the art may be applied to my invention. For example, flexible metallic hangers to which the card holders are swingably secured by eyelet or hinge means and the like, well known in the art may likewise be used. The card holder 13 is additionally provided with a sheath or pocket 15 embracing its lowermost marginal edge, the sheath being preferably of transparent material and secured to the card by means such as the staples 16 adjacent their side edges.

The progressive signalling means comprises, as previously stated, two portions, one being the masking insert shown in detail in Fig. 7 and comprising an elongated strip of material overfolded on the line 17 to provide a rear folded portion 18 and a front folded portion 19, to provide a rear folded portion substantially the length of but slightly less than that of the sheath 15 so that it may be inserted within the sheath and between the staples 16 to extend substantially the entire free length of the sheath. The front fold portion 19 has a length approximately half that of the rear fold 18, the front fold 19 comprising the signal masking portion. For cooperation with this masking means insert I provide a signalling strip 20 having a lateral projection 21 extending from its upper marginal edge to provide a handle portion which may be slightly convex outwardly so as to enable it to be more readily grasped and manipulated in signalling use thereof. This signalling strip is provided at its lower marginal edge with the extensions 22 and 23 which are overfolded rearwardly against the body of the strip 20, although slightly spaced therefrom to provide embraceable hook-like engagement means, and it will be understood, although not illustrated, that these portions 22 and 23 may be of varying width even to the extent of being merged to form a single continuous overfolded edge portion.

Thus for cooperative concealment and exposure by the overlay mask portion 19 of the insert, the signalling strip is engaged to the lower marginal edge of the insert rear fold portion 18 by the engagement portions 22 and 23, and whereby the handle portion 21 of the signalling strip is exposed and the opposed end of the strip extends beneath the overlay mask 19. These two portions, that is, the insert and the signalling strip in their cooperative engagement are inserted within the sheath 15 of the holder 13, and therein engaged against accidental withdrawal or movement upwardly from the sheath by means of the lugs 24. These lugs 24 may be in the form of tongue or prong-like die-cut downward projections adjacent the side edges of the card holder 13 and adjacent the lower marginal edge portion thereof as illustrated, although it will be understood that although not shown, I may provide a single similar lug intermediate and substantially mid-way between the side edges of the holder. These lugs 24 need not be large, and preferably are relatively small as illustrated, and may be provided, as previously stated, on a generally conventional form of card holder, such as one already provided with the various slots or slits 25 for engaging the upper corners of the record card 26, the lines of perforation which result in the hinge portion 14, and the like. If desired, these conventional card holders may be originally formed with the lugs 24, or if not so originally provided, the lugs may be die-cut by means of a hand punch to form the downwardly projecting prongs.

Thereafter to complete the assembly, a record or index card 26 may be mounted on the holder 13 by inserting the upper corners through the slots 25, conventional in card holders of this class, and by inserting the lower marginal edge thereof within the sheath 15, in a manner whereby it overlies the rear fold portion 18 of the insert and extends beneath the signalling strip 20 and the front fold 19 of the insert. The card 26 is provided with suitable indicia or a scale at the lower marginal edge portion 41 thereof and whereby the signalling strip 20 may cooperate with the mask portion 19 and with the data portion 41 on the index card for graphically illustrating the information desired to be conveyed, by exposing in varied degree the signalling strip, which is preferably in the form of a colored strip although it may have some residual transparency.

It will thus be seen that I have provided by means of a simple and inexpensive construction, a progressive signalling means which is adapted for use with existing installations and with a generally conventional class of card holders and index cards, and may be securely engaged to the card holder to prevent accidental displacement therein by means of a slight modification which may be preformed on the card holder without impairing its normal use in the absence of the signalling means, if desired, or may be readily provided on existing equipment, likewise without preventing or altering the holder to such an extent that it may not be used for other purposes or for the purposes originally intended if desired.

In the modified form of my invention shown in Figs. 8, 9 and 10, I employ a card holder 13 having a transparent sheath 15 embracing its lower marginal edge, an insert overlay comprising a rear folded portion 18 and a front folded masking means portion 19, and a signalling strip 20 engaged thereto by the tab extensions 22 and 23, the over-folded masking means and cooperative signalling strip being inserted within the sheath 15 and the rear folded portion 18 being engaged to the holder 13 by means of the downwardly projecting lugs 24, in the manner shown and described with respect to Fig. 1. However, in this modification of my invention I employ a record card 27, the lower marginal edge portion thereof being inserted beneath the rear folded portion 18 of the insert and extending within the sheath 15. This card 27 may be of conventional width throughout the major portion of its length, and of reduced width at the lower marginal edge portion 28 thereof, which may be provided with cut out corner portions as illustrated so that the record card may by-pass the engagement lugs 24 and be thereby enabled to extend beneath the rear folded portion 18 of the insert. It will, of course, be understood that if desired a narrower card 27 may be used having a uniform width equal to that of the portion 28.

It will also be understood, although not shown, that as described in connection with Fig. 1, the holder 13 may be provided with a single centrally or otherwise positioned downwardly projecting lug 24 for engagement of the rear fold 18 of the insert; also the card 27 may be provided with intermediate cut out portions or slots so as to by-pass such intermediately positioned engagement lug and enable the lower marginal portion of the record card to be inserted beneath the rearward folded portion of the insert strip.

Thus with the use of a record card 27 having its lower marginal edge portion inserted in a sheath 15 and beneath the rear fold portion 18 of the insert strip, the signalling indicia instead of being provided on the lower marginal edge of the record card as shown at 41 in Fig. 1, said indicia may be provided on the exposed half of the rear folded portion 18 of the insert as at 42. Thus the signalling strip 20 may cooperate with the mask portion 19 of the insert and with the data portion 42 and the rear folded portion 18 of the insert for graphically illustrating the information desired to be conveyed.

Figs. 11, 12 and 13 illustrate a further modification of my invention wherein I make use of a card holder 29 provided with the usual transparent sheath 15 embracing its lower marginal edge portion, the sheath being engaged to the holder by means of staples 16 adjacent the opposed ends thereof. In this form of my invention the card holder 29 is generally similar to the card holder shown in Fig. 1, but does not require the use of, and is not necessarily provided with, the lugs 24 shown in Figs. 1 and 8 for the reason that I provide the insert overlay with means engageable with the staples 16 which secure the sheath to the holder. Thus I provide an insert comprising an elongated strip of material over-folded on the line 32 to provide a rear portion 30 substantially the length of the sheath between the staples 16, and a front folded portion 31 which forms a mask for the signalling strip 20, and in this respect the insert strip is similar to the signalling means shown in Figs. 1 and 8. However, in this form of my invention the insert is provided with laterally endwise extending tabs 33 and 34 which are adapted to be inserted beneath the staples 16 as shown in Fig. 12 so as to retain the entire insert and cooperative signalling strip in position within the sheath and against accidental upward withdrawal thereof.

With this form of my invention I may use a conventional record card 35 similar to the record card 26 shown in Fig. 1. Also in this form of the invention the record card 35 may be positioned either beneath the rear fold portion 30 of the insert in which case indicia for cooperating with the signalling means is provided on the exposed half of the rear fold portion 30, and the use thereof is similar to that described with respect to Fig. 8, or the record card 35 may be positioned forwardly of the rear fold portion 30 of the insert and beneath the signalling strip 30 and front fold portion 31 in a manner similar to that set forth with respect to Fig. 1, and in the latter case the signalling indicia for cooperation with the slidable signalling strip is provided on the lower marginal portion of the card as described with respect to the card 26 shown in Fig. 1 and for use in like manner.

Figs. 14 and 15 show a further modification of my invention similar to Figs. 11 to 13, that is, I provide an elongated strip of material over-folded on the line 38 to provide the rear fold portion 36 and the front fold mask portion 37 and laterally endwise projecting tabs 39 and 40. It will be noted that whereas the tabs 33 and 34 shown in Fig. 11 are formed intermediate the top and bottom edges of the insert so as to enable them to be engaged within the staples 16, in the form shown in Fig. 14 the tabs are positioned at the lower marginal edge of the insert strip whereby they may become engaged between the lower end of the staples 16 and the fold of the sheath 15 so as to cause the insert to be engaged within the sheath 15 against accidental upward withdrawal therefrom. The use of this form is in other respects similar to that described with respect to Figs. 11 to 13.

Figs. 16 to 20 illustrate a further modification of my invention wherein use is made of the card holder 13, the sheath 15 embracing its lower marginal edge, and insert strip retention lugs 24 projecting from the holder 13. In this form of my invention, however, I provide a modified form of insert overlay 45 comprising an elongated strip of a width substantially that of the width of the card holder between its sheath retaining staples 16, provided with a lateral extension 46 along substantially one-half of the lower marginal edge portion thereof. This extension is provided with two lines of fold, one 47 being an extension of the lower marginal edge of the portion 45, and the second the line 48 adjacent the outer edge of the portion 46, the portion 46 being folded on the lines 47 and 48 to form a tube or sleeve overlying the strip 45, and thereby adapted for signalling use as a mask in concealment and exposure of the signalling strip 49. In this instance the signalling strip 49 which is generally similar to the signalling strip 20 described in connection with the foregoing forms of my invention, is provided with but a single return bent engagement lug 50 extending from the lower edge of the strip and at the end thereof which is provided with the handle portion 51, so that the remaining portion of the strip 49 may freely extend and slide within the tube formed by the portion 46, and by reason of such tubular formation the end of the strip which is freely slidable therein is maintained against accidental upward withdrawal.

The signalling means comprising the strip 45 and engaged signalling strip 49 may then be inserted as a unit on the card holder 13 and within its sheath 15 and engaged therein against upward withdrawal by means of the downwardly depending lugs 24. Thereafter the record card 26 may be positioned in the card holder by extending its lower marginal edge portion within the sheath 15, in a manner whereby it overlies the portion 45 of the insert and beneath the masking tube 46 and engaged signalling strip 49 as illustrated in Figs. 16 and 17. The card 26 may be provided with suitable indicia 41 at its lower marginal edge portion whereby the signalling strip 49 may cooperate with the tubular mask portion 46 for graphically illustrating the information desired to be conveyed by exposing in varied degree the signalling strip.

In the event that it is desired to provide signalling indicia on the face of the inserted strip 45, for use with the signalling strip 49, use may be made of a record card similar to the record card 27 shown in Fig. 8 having a reduced width at its lower portion to by-pass the lugs 24 and to permit the card to be inserted within the sheath by being positioned beneath the strip 45. It will be also understood that like modifications of the record card, or positioning of the lugs 24, may be embodied as set forth with respect to Fig. 8.

Figs. 21 to 23 illustrate a further modification of my invention wherein use is made of a signalling means substantially the same as that shown in Fig. 18 but modified with respect to the manner of the engagement thereof within the sheath of the holder substantially as shown in the form of Figs. 14 and 15. Thus I provide an insert strip 52 having a tubular portion 53 foldable on the lines 54 and 55 against the body of the strip 52 to provide a mask and end engagement means for the signalling strip similar to the form shown in Figs. 16 to 20, but provide endwise lateral extensions 56 and 57 adjacent the lower marginal edge of the strip 52 whereby the strip 52 may be engaged on the holder and within the sheath 15 against accidental upward withdrawal by causing the extensions 56 and 57 to be engaged beneath the lower ends of the staples 16 so as to permit of the use of a holder 29 as shown in a manner previously described with respect to Figs. 14 and 15. It will likewise be understood that the endwise engagement lugs 56 and 57 may be positioned intermediate the top and bottom longitudinal edges of the strip 45 for engagement within the staples 15, in the manner described and shown in Figs. 12 and 13.

Figs. 24 to 31 illustrate another modified form of progressive index signal means, as a separate unit in combination with a pocket record card, although the pocket card may be used as a card holder with modification. In general the card shown comprises a card and sheath embracing the lower marginal edge portion thereof similar to the forms previously described; and the progressive signal index means, in general comprises an insert strip and slidable signalling strip which may be utilized as a combined indicia insert and progressive signal in a manner similar to the forms illustrated in Figs. 8 and 12.

In this modification the card comprises a body 57 which may be mounted on suitable hangers 58. The lower marginal edge of the card body 57 is embraced by a transparent sheath 59, the rear leg of the sheath being provided with an in-turned folded edge 60. The card body 57 is provided with a plurality of longitudinally spaced apart circular die cuts adjacent the lower marginal portion thereof to provide a plurality of up-standing lips 61, the sheath being slidably engaged over the lower marginal edge of the card, whereby the lips 61 are engaged beneath the folded edge 60, of the sheath to form an interlock. The sheath 59 is additionally engaged to the holder by means of a single rivet 62 at one end of the sheath, the opposed end 63 being open endwise. The progressive signal means comprises an insert overlay in the form of a longitudinally folded sheath, the rear leg 64 thereof being provided with an out-turned folded edge 65 whereby the overlay may be slidably inserted within the sheath 52 at the open end 56, as best illustrated in Fig. 28, to embrace the lower marginal edge of the card body 57. The overlay additionally comprises an out-turned leg 66 folded forwardly to provide a signal masking portion. This signal masking portion 66 is provided with a longitudinally extending cut-out portion 67 at the lower marginal edge thereof to provide a sight opening for the signal strip 68 whereby the signal strip may cooperate with data generally indicated as 71 provided on the thus visible portion of the face of leg 64 of the insert. The signal strip 68 is formed with a laterally extending handle 69 at the upper edge thereof which extends through the slot 70 in the fold between the portions 64 and 65 of the overlay, the slot being of sufficient length whereby the strip 68 may be freely reciprocated longitudinally between the overfolded portions of the insert for variable concealment by the masking leg 66 and exposure by its aperture at 67.

It will thus be noted that in this form of my invention I provide a title insert strip provided with progressive signal masking means which may be slidably engaged to a pocket card having a sheath engaged thereto in a slightly modified manner, the insert being adapted to be engaged thereto by slidable insertion thereof between the card or card holder and its embracing sheath, and thereby firmly engaged against upward withdrawal from the sheath.

I claim as my invention:

1. A visible index record filing device of the class described comprising a card holder, a sheath adjacent the lower marginal edge thereof, a record card mounted on said holder, an overlay having front and back portions adjacent the lower marginal edge of said card, and a signalling strip slidably and embraceably engaged to the back portion only of said overlay for movement along said edge and extending within said overlay, the lower marginal edge portion of said card, overlay and signalling strip being received within and supported by said sheath.

2. A visible index record filing device of the class described comprising a card holder, a sheath embracing the lower marginal edge of said holder, a record card mounted on said holder with its lower marginal edge portion extending within said sheath, signal masking means having front and back portions supported within said sheath and overlying a lower marginal edge portion of said card, and a signalling strip slidably and embraceably engaged to the back portion only of said overlay for movement along the lower marginal edge portion of said card and for variable concealment and exposure by said masking means.

3. The combination with a visible index record card holder having a sheath enclosing the lower marginal edge portion thereof of a record card mounted on said holder, signal masking means engaged to said holder comprising an overlay portion having front and back portions adjacent the lower marginal edge of said card, and a signalling strip embraceably engaged to the back portion only of said overlay for slidable movement along the lower marginal edge portion of said card and for variable exposure and concealment by said overlay.

4. The combination with a visible index record card and holder having a sheath embracing the lower marginal edge portion thereof of a record card mounted on said holder and extending within said sheath, signal masking means extending within said sheath and engaged to said holder comprising an overlay having front and back portions superimposed over a lower marginal edge portion of said card, and a signalling strip engaged for sliding movement within said sheath comprising means in embracing association with the back portion only of said overlay.

5. Progressive signal index means comprising an overlay consisting of a strip folded vertically intermediate its length for masking a lower marginal edge portion of a record card having a sheath embracing the lower marginal edge portion thereof, and a signalling strip comprising means in embracing engagement with a rearward folded portion of said overlay for slidable movement within said sheath adjacent the lower marginal edge portion of said card and for variable concealment and exposure by said overlay.

6. Progressive signal index means comprising an overlay consisting of a strip folded vertically intermediate its length for masking a lower marginal edge portion of a record card mounted on a card holder having a sheath embracing the lower marginal edge portion thereof, and a signalling strip embraceably engaged to a rearward folded portion of said overlay or slidable movement within said sheath adjacent the lower marginal edge portion of said card and for variable concealment and exposure by said overlay.

7. A visible index record filing device of the class described comprising a card holder, a sheath adjacent the lower marginal edge thereof, a record card mounted on said holder, an overlay comprising a strip folded vertically intermediate its length extending over a lower marginal edge portion of said card, and a signalling strip comprising means in embracing engagement with a rearward folded portion of said overlay and for slidable movement along said lower marginal edge card portion and extending within said overlay, the lower marginal edge portion of said card, overlay and signalling strip being received within and supported by said sheath.

8. Progressive signal index means comprising an overlay for masking a lower marginal edge portion of a record card mounted on a card holder having a sheath embracing the lower marginal edge portion thereof, and a signalling strip for slidable movement within said sheath adjacent the lower marginal edge portion of said card and for variable concealment and exposure by said overlay, the said signalling strip comprising means for embraceably engaging the lower marginal edge of said card.

9. A slidable signal member for progressive visible indexes comprising an elongated strip having a handle portion extending laterally from the upper marginal edge thereof and a rearwardly overfolded tab extension from the lower marginal edge thereof adapted for slidable embracing engagement with the edge of a card or the like sheet material.

10. A slidable signal member for progressive visible indexes comprising an elongated strip having a handle portion extending laterally from its upper marginal edge adjacent one end thereof and rearwardly overfolded tab extensions from the lower marginal edge thereof adjacent its ends adapted for slidable embracing engagement with the edge portion of a card or the like sheet material.

11. The combination with a visible index record card holder having a sheath adjacent the lower marginal edge portion thereof of a record card supported thereon with its lower marginal edge portion extending within said sheath, a longitudinally extending overlay providing signal masking means for a lower marginal edge portion of said card extending within said sheath, means for maintaining said overlay within said sheath comprising an integral rearward folded extension from said signal masking means engaged to said holder by downwardly projecting lug means extending from the face of the holder, and a signalling strip slidably engaged for movement along the lower marginal edge portion of said card and said overlay rearward folded portion, and for variable concealment and exposure by said masking means.

12. Progressive signal index means comprising a longitudinally slidable signalling strip and an elongated strip adapted to be supported by a card holder of the class having a sheath adjacent the lower marginal edge thereof, the said strip comprising a base portion for engagement with cooperative means on said holder and a laterally extending portion folded thereover to provide masking means for the longitudinally slidable signal, and the said signalling strip having a rearwardly folded tax extension from the lower marginal edge thereof in slidable embraceable engagement with said base portion.

13. Progressive signal index means comprising a longitudinally slidable signalling strip and an elongated insert strip adapted to be supported by a card holder of the class having a sheath embracing the lower marginal edge thereof, the said strip comprising a base portion and a lateral extension thereof folded thereover to provide masking means for the longitudinally slidable signalling strip, the said insert strip being adapted to extend within said sheath and be normally retained therein, and the said signalling strip having rearwardly over-folded tab extensions from the lower marginal edge thereof adjacent its ends in slidable embracing engagement with said base portion.

14. Progressive signal index means comprising a longitudinally slidable signalling strip and an elongated insert strip adapted to be supported by a card holder of the class having a sheath embracing the lower maginal edge thereof, the said strip comprising a base portion and a lateral extension thereof folded thereover to provide masking means for the longitudinally slidable signalling strip, the said insert strip being adapted to extend within said sheath and be normally retained therein, and the said signalling strip comprising means for slidably and embraceably engaging said elongated strip base portion.

15. Progressive signal index means comprising an elongated insert strip having a lateral extension folded thereover and concealing a portion of the length thereof, the said strip being adapted to be superimposed over a lower marginal edge portion of a record card supported by a card holder of the class having a sheath adjacent the lower marginal edge portion thereof to provide signal masking means, the rear fold thereof being adapted for engagement within said sheath by means on said holder, and a signalling strip slidably engaged to said rear fold portion and embracing the lower marginal edge thereof extending beneath the overfolded portion of said insert strip for variable concealment and exposure thereby and for signalling cooperation with the exposed portion of the rear fold of said strip and said card.

16. Progressive signal index means comprising an alongated insert strip having a lateral extension folded thereover and concealing a portion of the length thereof, the said over-fold being adapted to be superimposed over a lower marginal edge portion of a record card supported by a card holder of the class having a sheath adjacent the lower marginal edge portion thereof to provide signal masking means, and the rear fold thereof being adapted for engagement within said sheath by means on said holder, and a signalling strip slidably engaged to said rear fold portion and embracing the lower marginal edge thereof extending beneath said masking means for variable concealment and exposure thereby and for signalling cooperation with an exposed portion of the lower marginal edge of said card.

17. The combination with a visible index record card holder having a sheath embracing the lower marginal edge thereof and a record card supported thereon with its lower marginal edge portion extending within said sheath, of progressive signal index means comprising an elongated endwise folded insert strip having its front fold superimposed over a lower marginal edge portion of said card to provide a signal mask and its rear fold engaged by engagement means on said holder comprising downwardly extending lugs formed adjacent its lower marginal edge and adjacent to its side edges, and a signalling strip comprising means in slidable engagement with said rear fold portion, extending endwise beneath said front fold portion for variable concealment and exposure thereby and for signalling cooperation with an exposed lower marginal edge portion of said card.

18. The combination with a visible index record card holder having a sheath embracing the lower marginal edge thereof and a record card supported thereon with its lower marginal edge portion extending within said sheath, of progressive signal index means comprising an elongated insert extending within said sheath and adjacent the lower marginal edge of said card and maintained therein against upward withdrawal by engagement means on said holder, the said insert comprising a strip folded vertically intermediate of its length thereby forming a signal mask, and a signalling strip comprising means in slidable embracing engagement with the rearward folded portion of said insert strip, the said signalling strip extending endwise beneath said signal mask for variable concealment and exposure thereby.

19. A visible index record filing device of the class described comprising, a card holder having a sheath embracing the lower marginal edge thereof, the said card holder mounting an index card and receiving the lower marginal edge thereof together with a progressive signalling strip and an elongated endwise folded signal masking means strip superimposed thereover within said sheath, the said holder comprising downwardly and forwardly projecting lug means formed adjacent its lower marginal edge for engaging an upper marginal edge portion of said folded strip and to impede normal upward withdrawal thereof from said sheath, and the said index card being provided with slot means extending from its lower marginal edge whereby to by-pass said lug means.

20. A visible index record filing device of the class described comprising, a card holder having a sheath embracing the lower marginal edge thereof, the said card holder removably mounting an index card and receiving and retaining the lower marginal edge thereof within said sheath together with a progressive slidable signalling strip in engagement with an elongated folded signal masking means strip, the said holder comprising downwardly and forwardly projecting lug means formed adjacent its lower marginal edge portion for engaging the upper marginal edge of the rearward portion of said folded strip to impede normal upward withdrawal thereof from said sheath.

CHARLES E. ATTWOOD.